United States Patent Office.

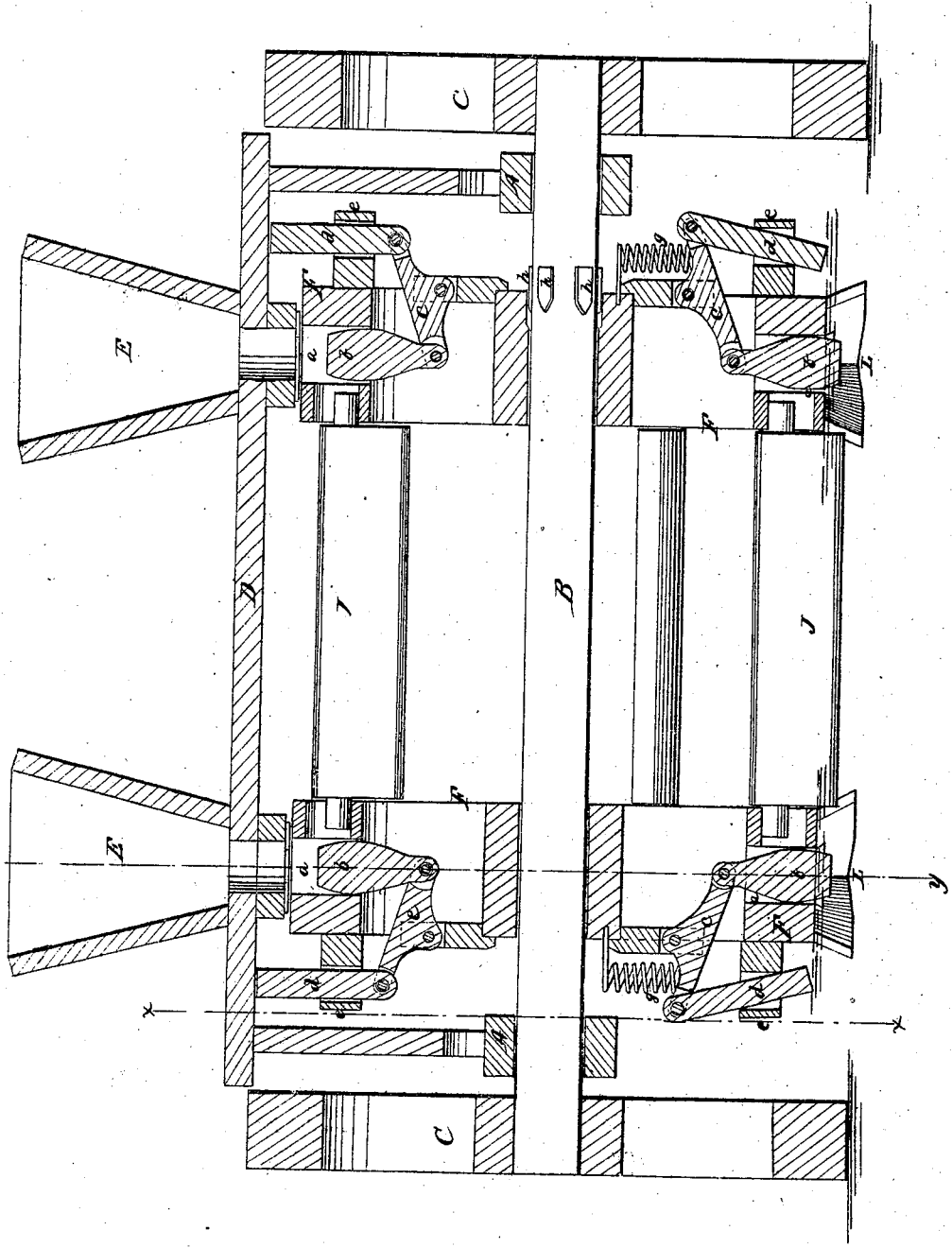

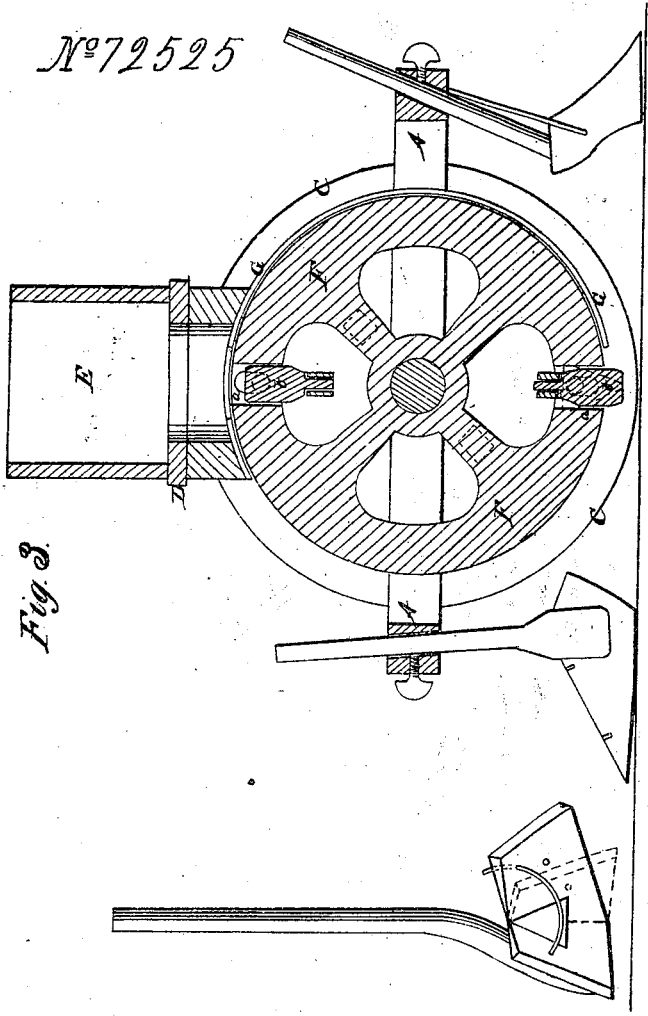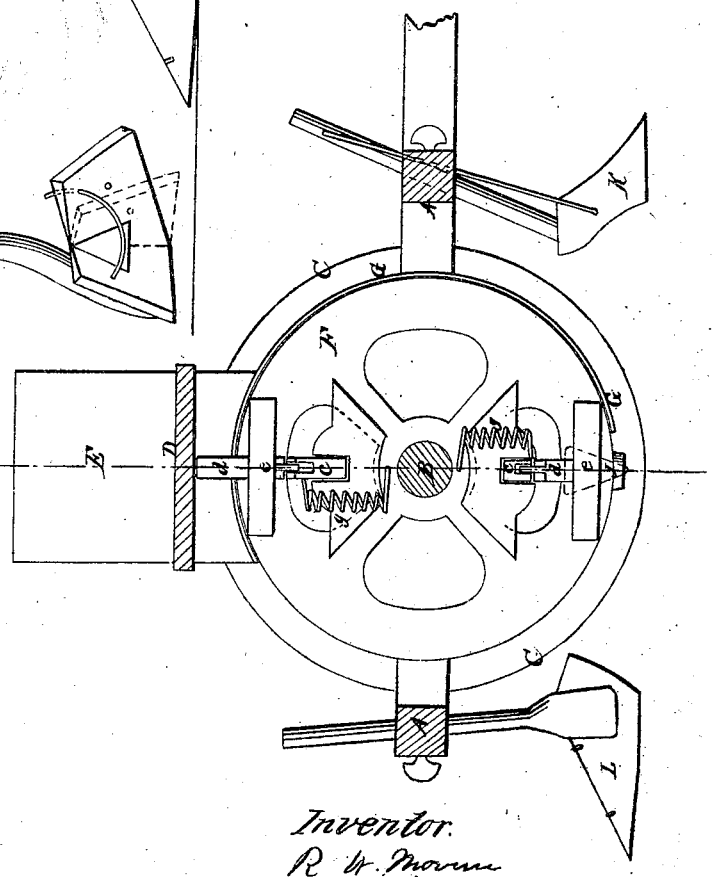

R. W. MORAN, OF CHICAGO, ILLINOIS.

Letters Patent No. 72,525, dated December 24, 1867.

IMPROVEMENT IN CORN-PLANTERS.

*The Schedule referred to in these Letters Patent and making part of the same.*

TO ALL WHOM IT MAY CONCERN:

Be it known that I, R. W. MORAN, of Chicago, in the county of Cook, and State of Illinois, have invented a new and improved Corn-Planter; and I do hereby declare that the following is a full, clear, and exact description thereof, reference being had to the accompanying drawings, making a part of this specification, in which—

Figure 1 is a front sectional elevation of the machine.

Figure 2, sheet 2, is a longitudinal section, taken in the vertical plane indicated by red line $x\ x$, fig. 1.

Figure 3, sheet 2, is a longitudinal section, taken in the vertical plane indicated by red line $y\ y$ in fig. 1.

Similar letters of reference indicate corresponding parts in the several figures.

This invention relates to an improvement on that class of corn-planters having the distributing-devices mounted upon wheels, so as to form a carriage to be drawn by horses.

The nature of my invention consists mainly in conducting the grains of corn from suitable receptacles or hoppers by means of rotating drums or cylinders having cells in their peripheries which will carry off the required number of grains to be planted, said cylinders being provided with aprons or guards in front, to prevent the escape of the corn from the cells until each cell successively arrives at the proper point for making a deposit, and said cells being provided with movable plungers so constructed and applied as to force the grains of corn into the earth and leave them in a condition for germinating, as will be hereinafter described.

The invention also consists in the use of triangular bars arranged between two laterally-adjustable cylinders or drums, for the purpose of marking off the land during the operation of planting, as will be hereinafter explained.

To enable others skilled in the art to understand my invention, I will describe its construction and operation.

In the accompanying drawings, A represents a rectangular frame, which is mounted upon the axle of two transporting-wheels, C C, which latter are fast upon their axle B, so as to cause it to revolve when the machine is drawn along. The frame A is constructed with a draught-tongue, and also with an elevated platform, D, which serves as the driver's seat, and also the support for two hoppers E E. These hoppers are arranged at equal distances on each side of the centre of the machine, and at such a distance apart as it is required to have the rows of corn. Directly beneath each hopper is a drum or cylinder, F, of suitable diameter and width, having seed-cells, $a\ a$, formed in its periphery for receiving the corn in proper quantities from the hopper and depositing the corn into the soil. Each drum F has two cells $a\ a$ in its periphery, arranged diametrically opposite each other, so that at every revolution of the drums four discharges of corn will take place. To prevent the grains of corn from falling out of the cells during their passage from the hoppers to the points of deposit, I apply an apron, G, to each wheel or drum F, so as to extend from its respective hopper over the circumference of the drum, down to the point of deposit, as shown in figs. 2 and 3. To each one of the cells $a$ I apply a plunger, $b$, as shown in fig. 3, the inner end of which is pivoted to a lever, $c$, that extends outward, and is pivoted to a short piece, $d$. This piece $d$ passes through a guide, $e$, and at times projects beyond the circumference of the drum, in which latter position it is held by a spring, $g$, as shown in fig. 1. The two drums F are connected together by means of bars or braces, and these drums are applied on the axle B, so that they can be conjointly moved in a direction with the length of said axle. It will be seen by reference to fig. 1 that elevations, $h$, are secured upon the axle B, which are adapted to fit into corresponding recesses formed in the eye of one of the drums, and thus connect the two drums with their axle, so that they will turn with it. The elevations $h$ are quite short, so that by moving the drums a short distance they will both be disengaged from said elevations, and will not turn with the axle. The drums may be moved, as stated, by means of a lever under the control of the attendant upon the machine. In line with the seed-cells $a\ a$ of both drums, triangular bars J are applied in planes parallel to the axle B, so as to mark off the ground during the operation of depositing the corn.

As the drums F rotate and carry down the grains of corn to be deposited into the ground, the outer ends of the pieces $d\ d$ are brought in contact with the ground and forcibly pressed upward. This causes the plungers $b\ b$ to force the charges of corn out of their cells, and to press the grains into the ground. As the cells rise, the pieces $d$ are released, and the springs $g$ allowed to force them outward again. The ploughs K clear the way for the planting of the corn, and the coverers L scrape the earth over the corn after it is dropped.

Having described my invention, what I claim as new, and desire to secure by Letters Patent, is—

1. The drums F F, applied upon the axle B of a two-wheel frame, and provided with hoppers E E, guards or aprons G G, and plungers $b\ b$, which latter are applied in the cells $a\ a$, and caused to press the grains of corn into the ground, substantially as described.

2. Applying both drums F F upon the turning-axle B, in such manner that said drums can be stopped or started at pleasure while the machine is being moved along, in combination with devices applied to the cells of said drums, which will automatically force the corn into the ground, substantially as described.

3. Providing the movable plungers $b\ b$ with levers $c$, guides $e$, and spring-pieces $a$, substantially in the manner and for the purposes described.

4. The markers J, applied to adjustable drums F in lines with the seed-cells thereof, substantially as described.

R. W. MORAN.

Witnesses:
 EDWIN A. FRYE,
 JOHN BLANKINSHIP.